(12) United States Patent
Waters

(10) Patent No.: US 7,301,494 B2
(45) Date of Patent: Nov. 27, 2007

(54) COMBINATION CELLULAR TELEPHONE AND RADAR DETECTOR

(76) Inventor: Jeffrey Waters, 12665 Emory Farm La., Sykesville, MD (US) 21784

( * ) Notice: Subject to any disclaimer, the term of this patent is extended or adjusted under 35 U.S.C. 154(b) by 164 days.

(21) Appl. No.: 11/121,466

(22) Filed: May 3, 2005

(65) Prior Publication Data

US 2005/0242984 A1 Nov. 3, 2005

Related U.S. Application Data

(60) Provisional application No. 60/567,578, filed on May 3, 2004.

(51) Int. Cl.
*G01S 13/86* (2006.01)
(52) U.S. Cl. .................. 342/20; 342/52; 455/556.1; 455/90.3; 455/575.9
(58) Field of Classification Search ............... 342/20
See application file for complete search history.

(56) References Cited

U.S. PATENT DOCUMENTS

| | | | | |
|---|---|---|---|---|
| 4,930,742 A | * | 6/1990 | Schofield et al. | 248/475.1 |
| 5,007,863 A | * | 4/1991 | Xuan | 439/639 |
| 6,204,798 B1 | * | 3/2001 | Fleming, III | 342/20 |
| 6,567,035 B1 | * | 5/2003 | Elliott | 342/20 |
| 6,591,168 B2 | * | 7/2003 | Odinak et al. | 701/1 |
| 6,939,155 B2 | * | 9/2005 | Postrel | 439/297 |
| 7,033,209 B2 | * | 4/2006 | Swiatek et al. | 439/502 |
| 7,183,942 B2 | * | 2/2007 | Rock et al. | 340/905 |
| 2003/0006888 A1 | * | 1/2003 | Burchette et al. | 340/425.5 |
| 2003/0020603 A1 | * | 1/2003 | DeLine et al. | 340/425.5 |
| 2006/0139203 A1 | * | 6/2006 | Kim et al. | 342/20 |

* cited by examiner

*Primary Examiner*—Thomas H. Tarcza
*Assistant Examiner*—Matthew M Barker
(74) *Attorney, Agent, or Firm*—Ober / Kaler; Royal W. Craig

(57) ABSTRACT

A system combining the features, elements, and operations of a cellular telephone and a radar detector into a unitary assembly. The present invention generally comprises a housing enclosing a power supply, an output speaker, an input microphone, an antenna, a display screen, a multi-button keypad, cell phone circuitry, and radar detection circuitry. The housing further incorporates a spring-loaded clip assembly that provides for "hands-free" cellular telephone operation. The present invention may include a plurality of operational modes that are manually selected by a user via the keypad. The operational modes may include "cellular telephone only", "radar detector only", and a hybrid mode wherein the system operates as a radar detector until an incoming cellular telephone signal is detected causing the system to convert to its cellular telephone operational mode. The present invention is easily transported and simple to use, fabricated of materials providing the appropriate degree of durability/longevity required by the nature of its use, and may be economically manufactured and sold.

13 Claims, 6 Drawing Sheets

COMBINATION CELLULAR TELEPHONE AND RADAR DETECTOR

CROSS-REFERENCE TO RELATED APPLICATIONS

The present application derives priority from U.S. Provisional Patent Application No. 60/567,578; filed: May 3, 2004.

BACKGROUND OF THE INVENTION

1. Field of the Invention

The present invention relates to multi-functional electronic devices and, more specifically, to cellular telephones incorporating non-telephony related functionality and, even more specifically, to cellular telephones that also serve as highway/roadway radar detectors.

2. Description of the Background

Electronic devices with multiple uses or functional modes are commonplace in the $21^{st}$ Century. A cellular telephone is one such example. It is now possible to obtain a cellular telephone that, in addition to allowing a user to make and receive telephone calls, also provides for the playing of video/computer games and/or the taking of digital pictures.

Yet another handy, electronic device is a police radar detector. A radar detector, designed to alert a motor vehicle operator to the presence of a police radar or speed trap, is typically a single function device meant to be semi-permanently mounted in a vehicle.

Given that cellular telephones have become a virtually indispensable tool of everyday life, they typically travel with their owner at all times—especially when he/she is traveling by motor vehicle. Therefore, the combination of cellular telephone and radar detection technologies into a single device represents a logical step in the continuing evolution of multi-functional electronic apparatus. The present inventor is not the first to suggest or produce this combination. U.S. patent application Ser. No. 2002/0152264 to Yamasaki and U.S patent application Ser. No. 2002/0032510 to Turnbull et al. disclose apparatus possessing cellular telephone and radar detection functionality.

U.S. patent application Ser. No. 2002/0152264 to Yamasaki discloses a network appliance that may be installed in a vehicle for transmitting and receiving information relating to interactions between a user and the vehicle, vehicle mechanics, information relating to the user, information relating to the vehicle's physical location, information relating to business locations, etc. Furthermore, the appliance accesses and interacts via a network such as the Internet with remote servers to obtain and transmit information relating to the user's relative surroundings, thereby providing the user specific personalized information. Among the functions of the network appliance are included the ability to make and receive cellular telephone calls and radar detection.

U.S. patent application Ser. No. 2002/0032510 to Turnbull et al. discloses a vehicle communication and control system that may be readily installed in a vehicle. The electrical components of the communication and control system "brick" are integrated into a rearview mirror assembly. Preferably, the microwave antenna for a GPS and a cellular telephone antenna are also integrated into the rearview mirror assembly. Various functions and features of the system, including radar detection, are also disclosed.

Unfortunately, each of the prior art references falls short of the optimum combination of cellular telephone and radar detection functionality. The Yamasaki and Turnbull et al. devices include a number of additional functions and are intended for permanent, or at least semi-permanent (i.e. use of a tool is required to attach/detach the device), mounting within a vehicle. To the best of the knowledge of the present inventor, the prior art does not contain an easy to use, readily transportable apparatus with user-selectable cellular telephone and/or radar detection operational modes.

Therefore, it would be greatly advantageous to supply an apparatus that is easy to use, may be easily transported by a user either by hand-carrying or detachable attachment to the user, may be detachably attached within a vehicle (i.e. readily removable from the vehicle), and incorporates multiple, user-selectable functional/operational modes. Apparatus of this type should be fabricated of materials providing the appropriate degree of durability/longevity due to the nature of use, and be economical to manufacture and sell to provide for widespread use.

SUMMARY OF THE INVENTION

It is, therefore, the primary object of the present invention to provide a cellular telephone with additional, useful, non-telephony related functionality.

It is another object of the present invention to provide a combination cellular telephone and highway/roadway radar detector.

It is yet another object of the present invention to provide a combination cellular telephone and highway/roadway radar detector that may be detachably attached to a user or to the user's automobile.

It is another object of the present invention to provide a combination cellular telephone and highway/roadway radar detector that, at the discretion of a user, may be used solely in a cellular telephone mode, solely in a radar detector mode, or in a combination mode as a radar detector until an incoming cellular telephone signal is detected at which time the system's functionality automatically switches over to that of a cellular telephone.

It is still another object of the present invention to provide a combination cellular telephone and highway/roadway radar detector.

It is yet another object of the present invention to provide a combination cellular telephone and highway/roadway radar detector that is easily transported and simple to use.

It is another object of the present invention to provide a combination cellular telephone and highway/roadway radar detector that is fabricated of materials providing the appropriate degree of durability/longevity.

Still another object of the present invention is to provide a combination cellular telephone and highway/roadway radar detector that is economical to manufacture and sell.

These and other objects are accomplished by a system combining the features, elements, and operations of a cellular telephone and a radar detector into a unitary assembly. The present invention generally comprises a housing enclosing a power supply, an output speaker, an input microphone, an antenna, a display screen, a multi-button keypad, cell phone circuitry, and radar detection circuitry. The housing further incorporates a spring-loaded clip assembly that allows the present invention to be detachably attached to either a user (i.e. a belt clip) or to a permanently/semi-permanently-mounted bracket in a vehicle—typically hanging from the inside of the windshield proximate the rearview mirror and/or the driver-side flip-down sunshade, or positioned atop the dashboard somewhere on the operator's side of the vehicle. Additionally, the clip assembly makes a valuable contribution to the safe operation of the motor vehicle by providing for "hands-free" cellular telephone operation (i.e. the vehicle's operator may keep both hands on the steering wheel) when the system is detachably attached to the permanently/semi-permanently-mounted bracket inside the vehicle.

The present invention may include a plurality of operational modes that are manually selected by a user via the keypad. The operational modes may include "cellular telephone only", "radar detector only", and a hybrid mode wherein the system operates as a radar detector until an incoming cellular telephone signal is detected causing the system to convert to its cellular telephone operational mode. The system's chosen operational mode is displayed on the screen. Any audible output of the device, whether operating as a cellular telephone or radar detector, is directed through the single output speaker. The present invention is easily transported and simple to use, fabricated of materials providing the appropriate degree of durability/longevity required by the nature of its use, and may be economically manufactured and sold.

An alternative embodiment of the present invention provides radar detection capability that may be retrofitted to existing cellular telephones via a detachable connection to that apparatus.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENT

Figure 1:
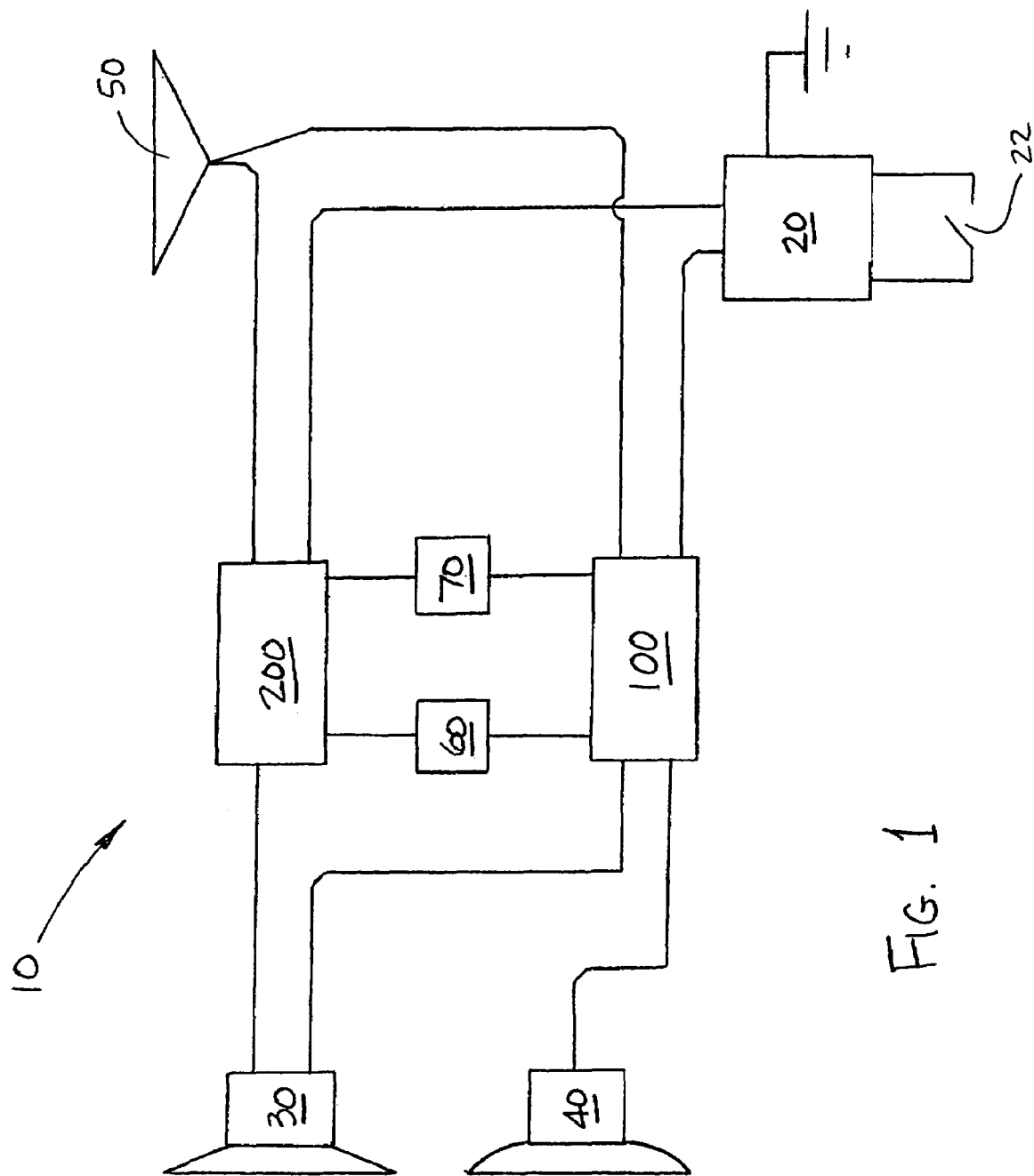
FIG. 1 is a schematic block diagram of a combination cellular telephone/radar detector 10, according to a preferred embodiment of the present invention, including cellular telephone circuitry 100 and radar detection circuitry 200.

FIG. 1 is a schematic block diagram of a combination cellular telephone/radar detector 10 according to a preferred embodiment of the present invention. Additional details relating to the cellular telephone circuitry 100 and the radar detection circuitry 200 of FIG. 1 are shown, respectively, in the schematics of FIGS. 2 and 3.

In addition to the cellular telephone circuitry 100 and the radar detection circuitry 200, the system 10 typically includes a power supply 20, an output speaker 30, an input microphone 40, an antenna 50, a display screen 60, and a multi-button keypad 70. The power supply 20, output speaker 30, input microphone 40, antenna 50, display screen 60, and multi-button keypad 70 are each conventional, commercially available components. For example, the power supply 20 may be either the TPS9013 or the TPS9104 commercially available from Texas Instruments of Dallas, Tex.

As indicated in FIG. 1, the cellular telephone circuitry 100 is connected to the power supply 20, the output speaker 30, the input microphone 40, the antenna 50, the display screen 60, and the multi-button keypad 70. The circuitry 100 draws its operating power from the power supply 20, provides audible (e.g. voice) output through the speaker 30, receives audible input through the microphone 40, receives/sends radio frequency (RF) input/output through the antenna 50, provides visual output (e.g. text messages) via the display screen 60, and receives data input (e.g. telephone numbers to be dialed) via the keypad 70. A commercially available switch 22 is shown connected to the power supply 20 for turning on/off the combination cellular telephone/radar detector 10 of the present invention.

As also indicated in FIG. 1, the radar detection circuitry 200 is connected to the power supply 20, the output speaker 30, the antenna 50, the display screen 60, and the multi-button keypad 70. The circuitry 200 draws its operating power from the power supply 20, provides audible (e.g. an alarm tone) output through the speaker 30, receives RF input (e.g. radar signals) through the antenna 50, provides visual output (e.g. text messages) via the display screen 60, and receives data input (e.g. commands to change operational mode) via the keypad 70.

The operational modes of the present invention typically include a "cellular telephone only" mode where the system 10 functions solely as a cellular telephone, a "radar detector only" mode where the system 10 functions solely as a radar detector, and a hybrid mode wherein the system operates as a radar detector until an incoming cellular telephone signal is detected causing the system to convert to its cellular telephone operational mode. The desired operational mode is user-selectable via the keypad 70 and displayed on the screen 60.

Figure 2:
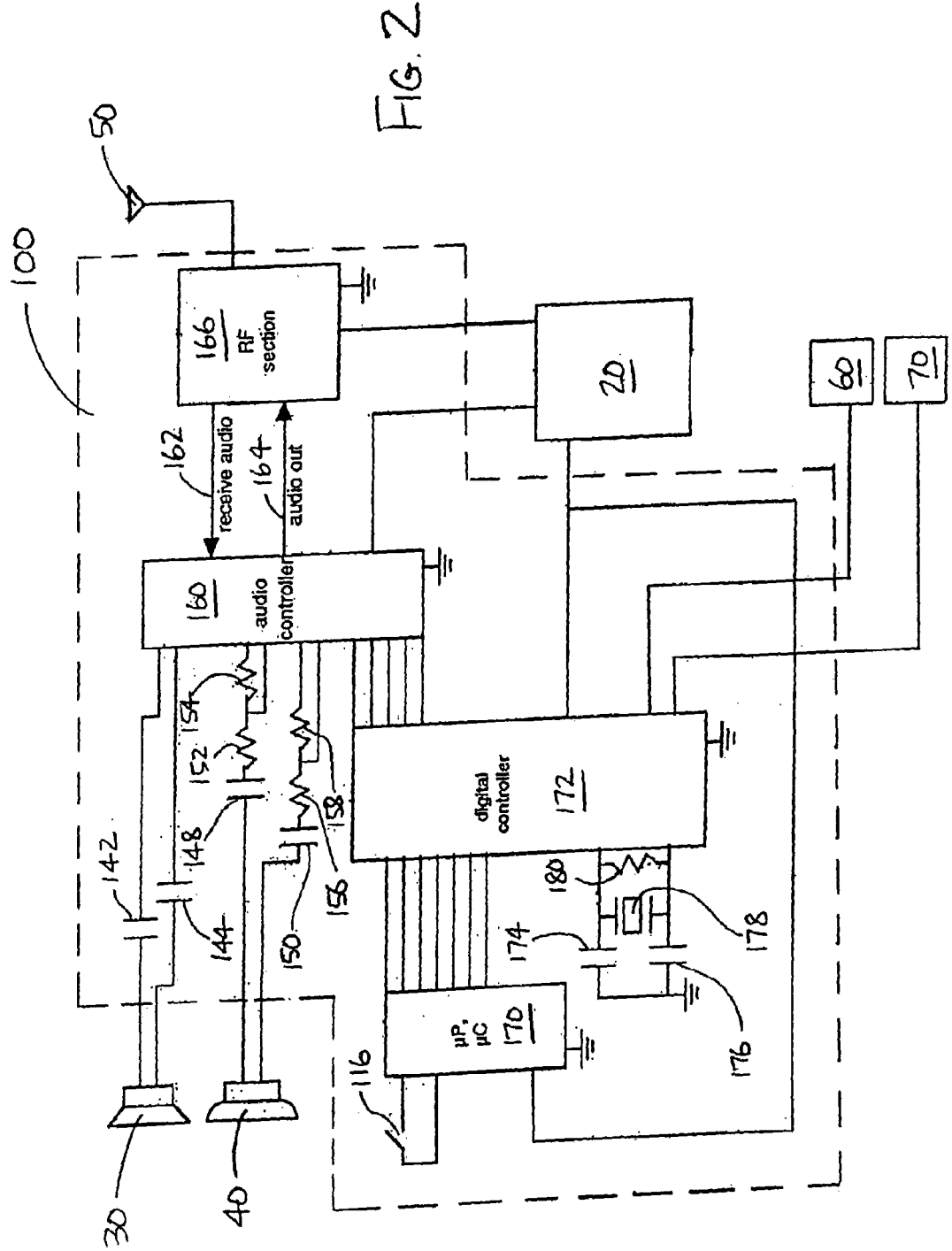
FIG. 2 is a schematic representation of the cellular telephone circuitry 100 of FIG. 1.

The circuitry 100 of FIG. 2 is meant to be broadly illustrative of that associated with the design of a conventional cellular telephone. It is circuitry that, in general, may be created by anyone skilled in the art of electrical engineering. The circuitry 100 is not meant to provide great detail as that is no longer necessary with this art. All of the electronic components are powered via the power supply 20.

A speaker 30 is coupled through capacitors 142 and 144 to audio controller 160. The audio controller 160 receives a demodulated audio line 162 from the RF section chip 166. The RF section chip 166 receives an RF signal from the antenna 50.

A microphone 40 is coupled through capacitors 148, 150 and resistors 152, 154, 156, 158 into the audio controller 160. The audio controller 160 then sends the "audio out" signal on line 164 into the RF section 166 for final transmission out on antenna 50. When a call button 116 is depressed, a microprocessor microcontroller 170 activates the appropriate functional sequences and a digital controller 172 gives the appropriate controls to the audio controller 160. The digital controller 172 is clocked by a crystal oscillator comprising capacitors 174, 176, a crystal 178, and a resistor 180.

A commercially available audio controller 160 is the TCM 8010 from Texas Instruments of Dallas, Tex. A commercially available RF section chip 166 is the TRF 1015 also from Texas Instruments. There are numerous manufacturers of microprocessors and microcontrollers. However, suitable devices are the 8051 or 8032 commercially available from any one of numerous electronic manufacturers. A commercially available digital controller 172 is the TCM 8002 also from Texas Instruments.

Figure 3:
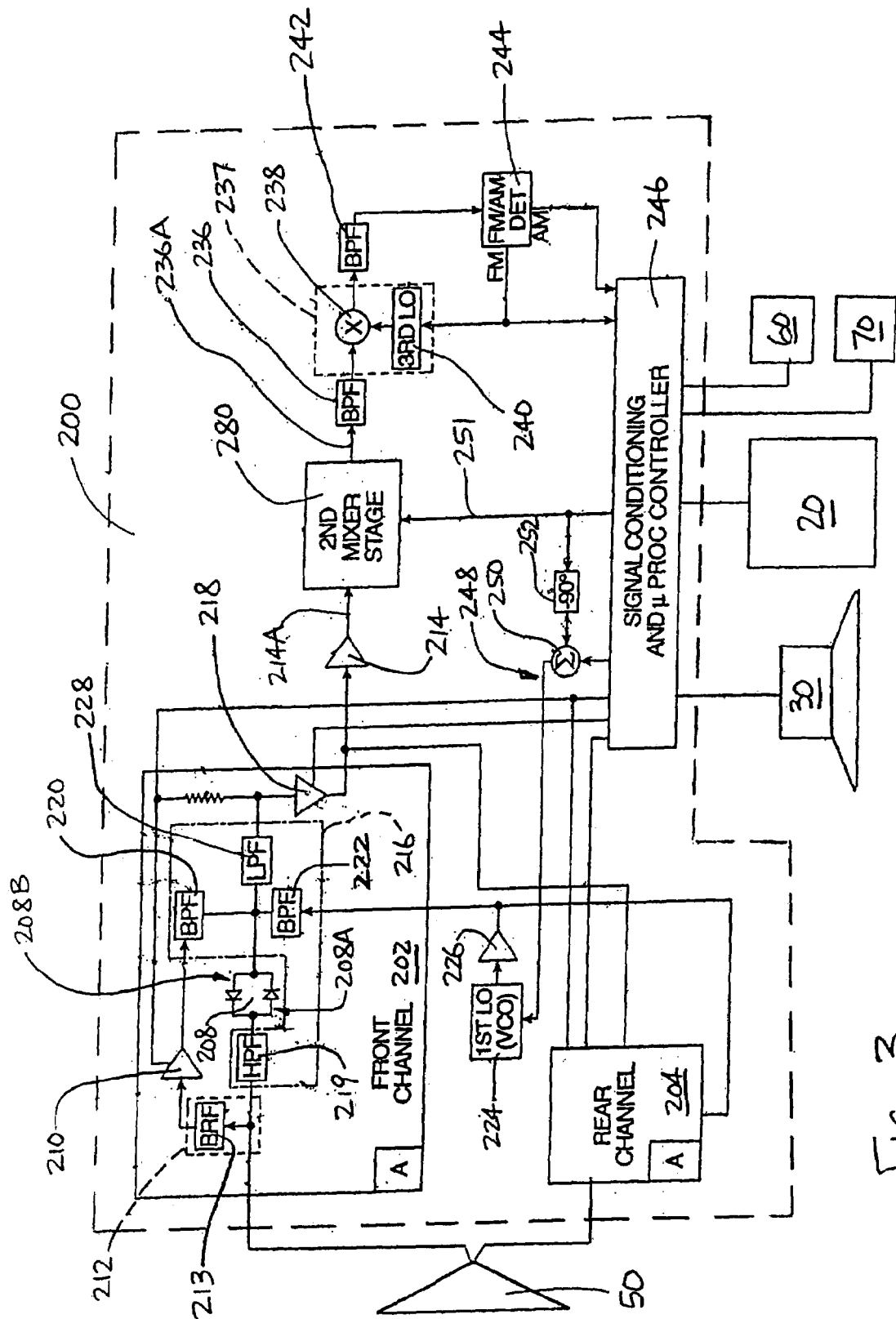
FIG. 3 is a schematic representation of the radar detection circuitry 200 of FIG. 1.

The circuitry 200 of FIG. 3 is meant to be broadly illustrative of that associated with the design of a conventional radar detector. It is circuitry that, in general, may be created by anyone skilled in the art of electrical engineering. The circuitry 200 is not meant to provide great detail as that is no longer necessary with this art. All of the electronic components are powered via the power supply 20.

The radar detector circuitry 200 utilizes heterodyne receiver principles for suitability in practicing the present invention. The circuitry 200 includes two input stages 202, 204 which are substantially the same, thus only the input stage 202 will be described in detail herein. The input stages 202, 204 correspond to a front channel and a rear channel, respectively.

The input stage 202 includes an antenna 50 for receiving incoming electromagnetic signals. The antenna 50 is coupled to a first mixer 208 and pre-amplification circuitry comprising an X band and $K_u$ band pre-amplifier 210 by a diplexer 212. The diplexer 212 comprises a K band and a $K_a$ band rejection filter 213 which rejects frequencies in a band extending from approximately 24 gigahertz (Ghz) to approximately 36 Ghz. The first mixer 208 comprises a pair of antiparallel diodes having a near side 208A coupled to the antenna 50 by the diplexer 212 and a high pass filter 219 and a far side 208B coupled to a first intermediate frequency (IF) amplifier 214 through a passive multiplexer 216 and a first IF pre-amplifier 218. The first IF pre-amplifier 218 and first IF amplifier 214 pass signals low enough to encompass a second intermediate frequency of about 725 megahertz (Mhz).

The passive multiplexer 216 comprises; the high pass filter 219 coupled between the antenna 50 and the first mixer 208, for passing signals in the K band (i.e. from approximately 24.05 Ghz to approximately 24.25 Ghz) and the $K_a$ band (i.e. from approximately 33.40 Ghz to approximately 36.00 Ghz), to the near side 208A of the first mixer 208; a first bandpass filter 220 designed to pass frequencies in the X band (i.e. from approximately 10.50 Ghz to approximately 10.55 Ghz) and the $K_u$ band (i.e. from approximately 13.40 Ghz to approximately 13.50 Ghz) to the far side 208B of the mixer 208; and a local oscillator or second bandpass filter 222 designed to pass first local oscillator (LO) signals to the far side 208B of the first mixer 208.

The first LO signals are generated by a first local oscillator (LO) 224 and amplified by an amplifier 226. The first LO 224 comprises a voltage controlled oscillator (VCO) and generates signals which sweep in frequency from approximately 15.160 Ghz to approximately 14.310 Ghz for sweeping the X band, from approximately 15.160 Ghz to approximately 14.310 Ghz (effectively approximately 30.320 Ghz to 28.620 Ghz) for simultaneously sweeping portions of the K band and the $K_a$ band, and from approximately 14.225 Ghz to approximately 14.125 Ghz for sweeping the $K_u$ band. The high pass filter 219 substantially prevents LO signals from being passed to and broadcast from the antenna 50 by serving as a short to ground for the LO signals so that the LO drive is delivered substantially to the mixer diodes with relatively little LO power being delivered to the antenna 50. The passive multiplexer 216 also comprises a low pass filter 228 which is designed to pass frequencies from direct current (DC) to approximately 6 Ghz. The band reject filter 213, which forms the diplexer 212, can also be considered as forming part of the passive multiplexer 216 since the passive multiplexer 216 must perform the functions of interconnecting the antenna 50, the first LO 224, the first mixer 208, and the first IF amplifier 214 with minimal loss from each source of signals to its respective destination.

The mixer 208 provides additional attenuation of any signals which may feedback toward the input of the X band and $K_u$ band pre-amplifier 110. Attenuation of these feedback signals reduces the possibility of oscillation of the X band and $K_u$ band pre-amplifier 110. The input stage 202 provides a very direct and low loss path for K band and $K_a$ band signals from the antenna 50 to the near side 208A of the mixer 208 which is believed to result in a favorable noise figure on the K and $K_a$ band.

Signals from the first IF amplifier 214 are passed to a second mixer stage 280 via a conductor 214A and from there to a bandpass filter 236 via a conductor 236A. Both the second mixer stage 280 and the bandpass filter 236 have a frequency of around 725 Mhz. The bandpass filter 236 is connected to a single sideband down converter 237 comprising a third mixer 238 and a third LO 240 operating at about 725.3 Mhz to down convert signals to approximately 300 kilohertz (Khz). The single sideband down conversion avoids degradation of the system noise figure by approximately 3 dB. The circuitry beyond the second mixer forms detector circuitry for detecting electromagnetic signals in the scanned radar bands.

A 300 Khz bandpass filter 242 passes signals from the down converter 237 to an amplitude detector and frequency modulation (FM) detector circuit 244, sometimes referred to as a discriminator or demodulator circuit. The FM output or frequency demodulation detection signal from the circuit 244 is passed to the third LO 240 to lock the system 10 onto incoming electromagnetic signals and also to signal conditioning and control circuitry 246 which includes a processor, preferably any one of a number of appropriate microprocessors.

Modulation circuitry 248, comprising a summer 250 and a 90° phase shifter circuit 252, is coupled between the signal conditioning and control circuitry 246 and the first LO 224 to connect a first modulation signal to the first local oscillator 224. A second modulation signal, generated by the signal conditioning and control circuitry 246, is connected directly to a second local oscillator (not shown in the Figures), a subcomponent of the second mixer stage 280, via a conductor 251. Upon detecting a valid radar signal (i.e. a radar signal in one of the X, $K_u$, K or $K_a$ bands), the signal conditioning and control circuitry 246 activates the speaker 30 and/or the display 60 which then provide an audible and/or visual alert to the motor vehicle operator.

Figure 4:
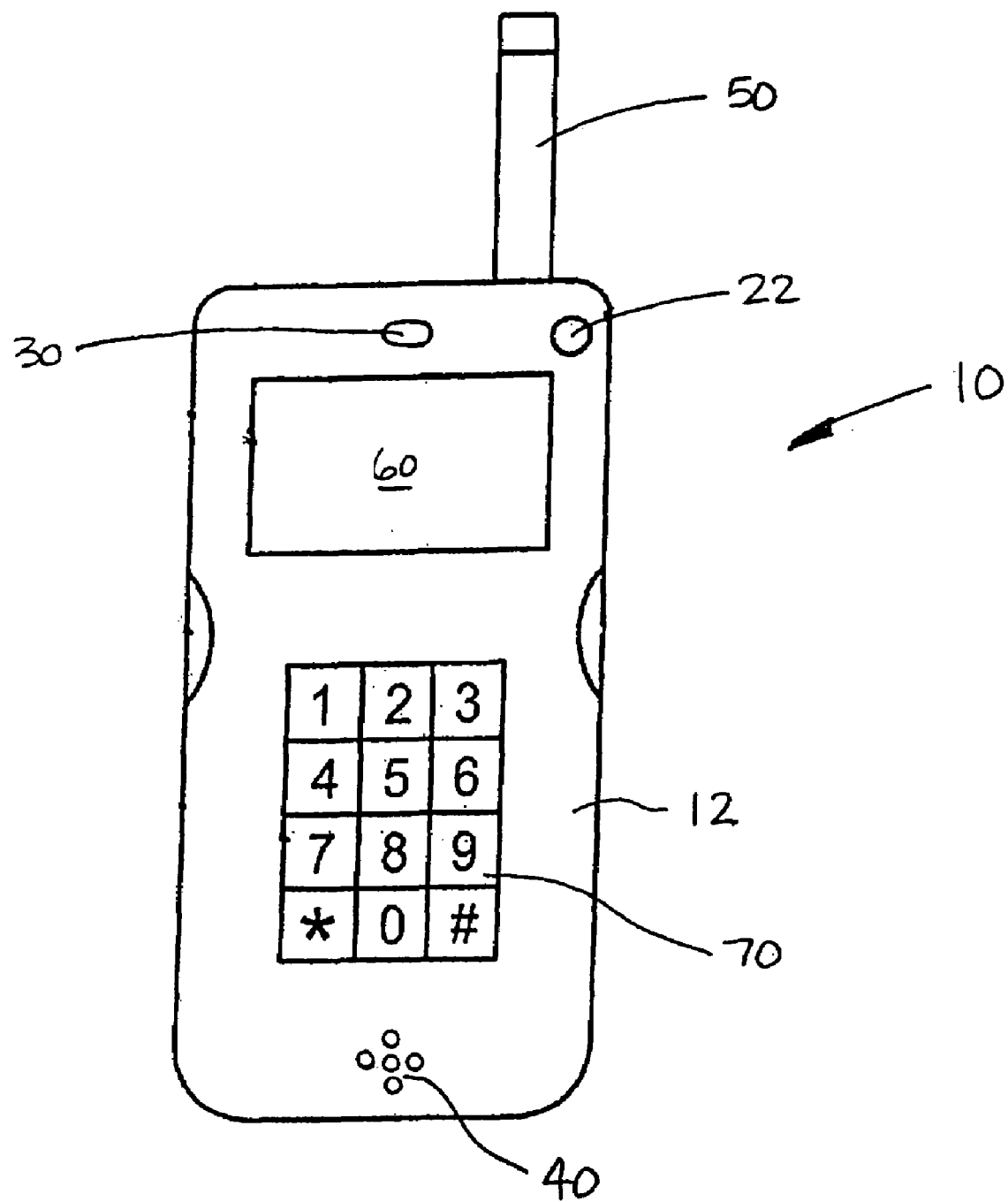
FIG. 4 is a front perspective view of the physical embodiment of the combination cellular telephone/radar detector 10 according to a preferred embodiment of the present invention.

FIG. 4 shows a front perspective view of the physical embodiment of the combination cellular telephone/radar detector 10 according to a preferred embodiment of the present invention. The combination cellular telephone/radar detector 10 comprises housing 12, a conventional output speaker 30, a conventional input microphone 40, a conventional antenna 50, a conventional display screen 60, and a conventional multi-button keypad 70. There is also a conventional on/off switch 22.

Mounted on the rear surface of the housing 12 is a spring-loaded clip assembly (not shown in FIG. 4, see FIG. 5) that allows the present invention to be detachably attached to either a user (i.e. a belt clip) or to a permanently/semi-permanently-mounted bracket in a vehicle—typically hanging from the inside of the windshield proximate the rearview mirror and/or the driver-side flip-down sunshade, or positioned atop the dashboard somewhere on the operator's side of the vehicle. Additionally, the clip assembly 80 makes a valuable contribution to the safe operation of the motor vehicle by providing for "hands-free" cellular telephone operation (i.e. the vehicle's operator may keep both hands on the steering wheel) when the system 10 is detachably attached to the permanently/semi-permanently-mounted bracket inside the vehicle.

Figure 5:
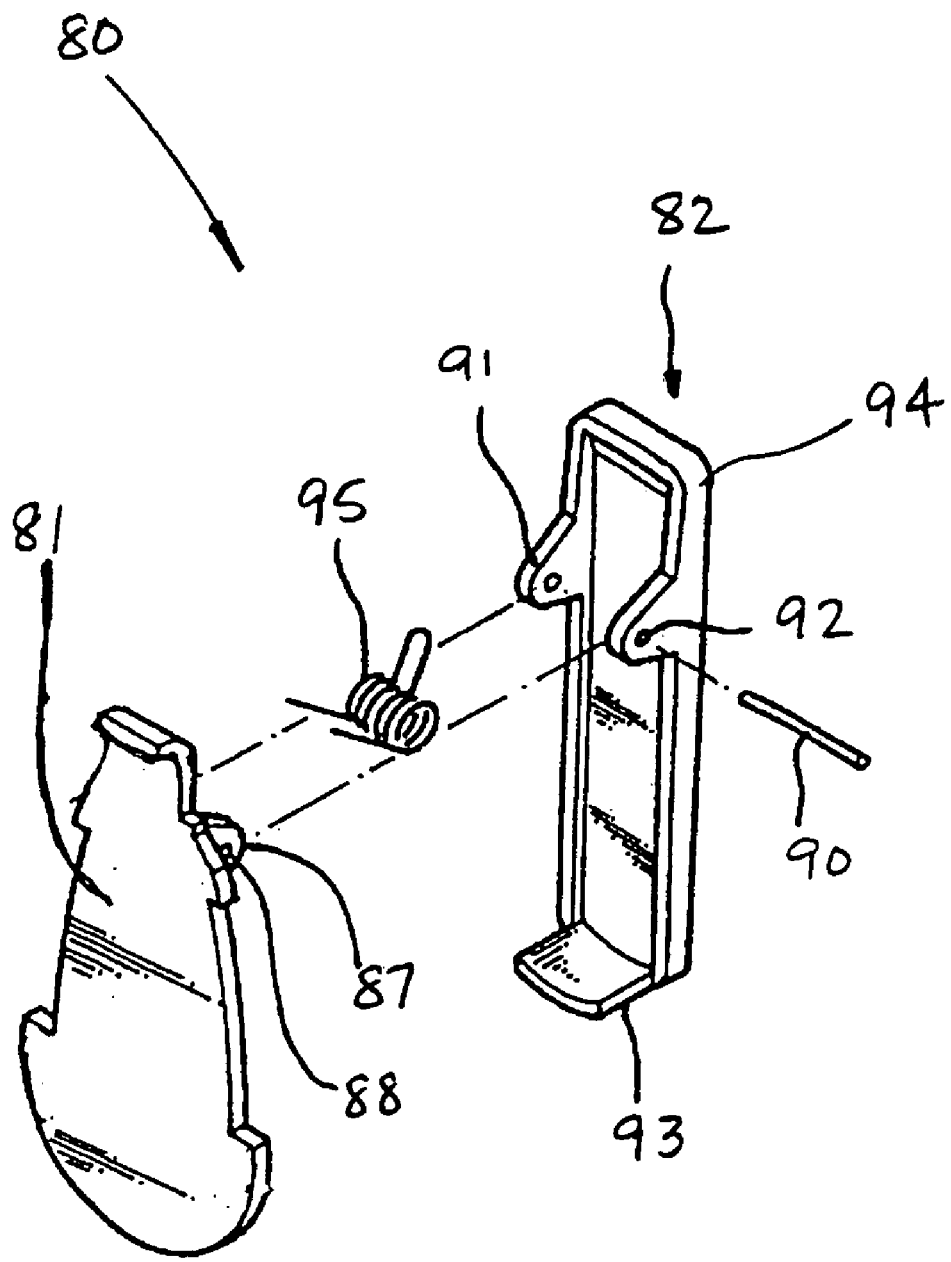
FIG. 5 is an exploded view of a spring-loaded clip assembly 80.

FIG. 5 is an exploded view of a spring-loaded clip assembly 80. The clip assembly primarily comprises a mounting plate 81, that may be affixed to the rear of the present invention's housing 12 (see FIG. 4), and a clamping plate 82. Fixedly attached to a surface of the mounting plate 81 are two, spaced apart lugs 87 (only one may be seen in FIG. 5) formed with respective pivot holes 88. The clamping plate 82 comprises two, spaced apart lugs 91 formed with respective pivot holes 92, and a stop flange 93 perpendicularly raised from the bottom end thereof, remote from the lugs 91. A pivot pin 90 is inserted through the pivot hole 92 on each lug 91 and the pivot holes 88 in the lugs 87 to secure the clamping plate 82 and the mounting plate 81 together. Further, a torsional spring 95 is mounted on the pivot pin 90, between the two lugs 87, and stopped between a surface of the mounting plate 81 and a surface of the clamping plate 82 to hold the clamping plate 82 in the clamping position where the stop flange 93 of the clamping plate 82 is pressed on the front side wall of the mounting plate 81.

Alternative clip assemblies may include, in place of a spring-loaded mechanism, resilient tabs that may forced apart slightly to grasp and/or create a friction fit with, for example, a user's belt or a dashboard-mounted bracket.

The present invention is easily transported and simple to use, fabricated of materials providing the appropriate degree of durability/longevity required by the nature of its use, and may be economically manufactured and sold.

Figure 6:
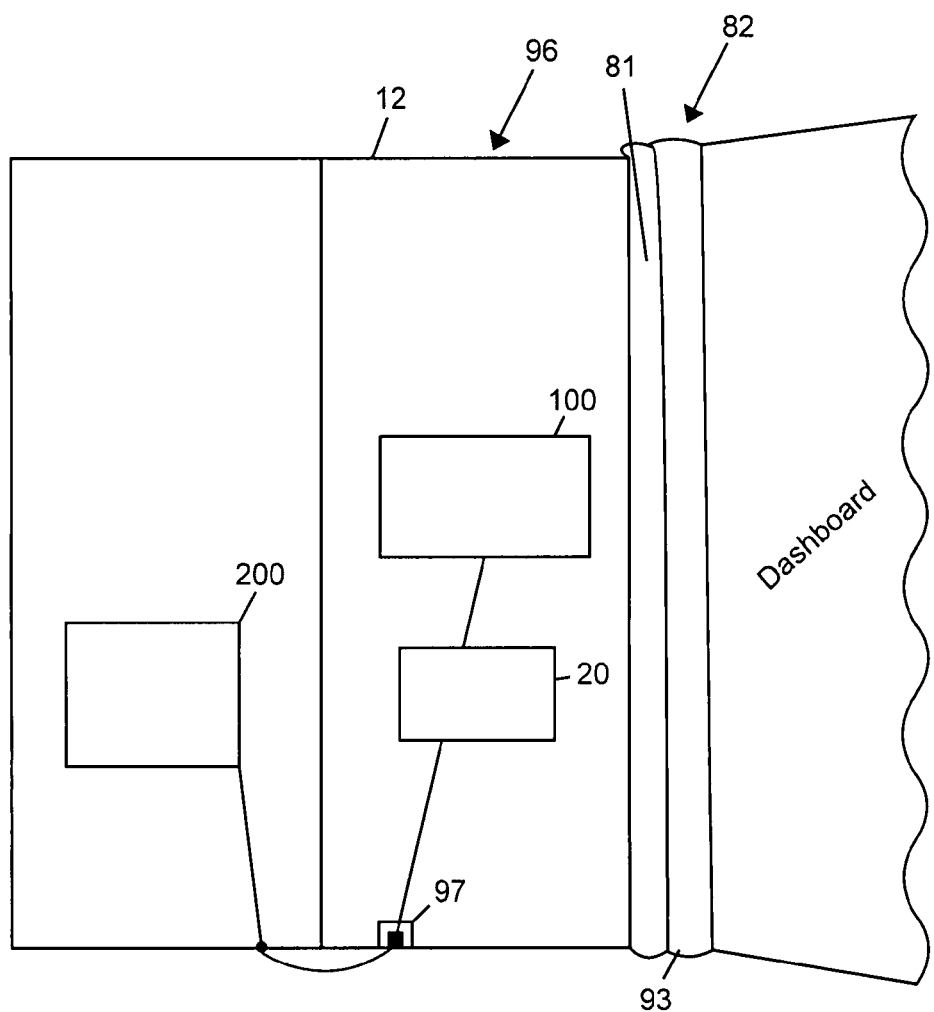
FIG. 6 is a schematic representation of an alternate embodiment of the invention.

An alternative embodiment of the present invention provides radar detection capability that may be retrofitted to existing cellular telephones via a detachable, or temporary, connection to that apparatus. FIG. 6 is a schematic representation of an alternate embodiment of the invention. Radar detection circuitry 200, contained within a second housing 94, may be detachably attached to an existing cellular telephone 96 via the charging port 97 for the telephone's onboard battery. This connection provides the radar detection circuitry 200 with access to the telephone's power supply 20, output speaker 30, antenna 50, display screen 60, and the multi-button keypad 70. The detachable radar detection circuitry 200 draws its operating power from the power supply 20, provides audible (e.g. an alarm tone) output through the speaker 30, receives RF input (e.g. radar signals) through the antenna 50, provides visual output (e.g. text messages) via the display screen 60, and receives data input (e.g. commands to change operational mode) via the keypad 70. Detection of the presence of the detachable radar detection circuitry may be via a sensor located within the charging port 97 or a photoelectric sensor installed in the telephone's housing 12 proximate the charging port 97.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A combination cellular telephone and radar detector, comprising:

a housing;

a power supply enclosed within said housing;

an on/off switch enclosed within said housing and electrically connected to said power supply;

cellular telephone circuitry enclosed within said housing and electrically connected to said power supply;

radar detection circuitry enclosed within said housing and electrically connected to said power supply;

an output speaker enclosed within said housing for outputting audio signals generated by both of said cellular telephone circuitry and said radar detection circuitry;

an input microphone enclosed within said housing and electrically connected to said cellular telephone circuitry;

an antenna attached to said housing and electrically connected to said cellular telephone circuitry;

a keypad mounted on said housing for controlling both of said cellular telephone circuitry and said radar detection circuitry, and for selecting one of a radar detection mode and a cellular telephone mode;

a display screen surface-mounted on said housing for displaying said selected operational mode.

2. The combination cellular telephone and radar detector according to claim 1, further comprising a clip assembly detachably attachable to said housing for attachment of said combination cellular telephone and radar detector to either a user's belt or underneath a vehicle sunshade.

3. A combination cellular telephone and radar detector according to claim 2 wherein said clip assembly is a spring-loaded clip assembly further comprising:

a mounting plate fixedly attached to the rear of said housing;

two opposing lugs fixedly attached to the surface of said mounting plate, each of said lugs having a pivot hole formed therein;

a detachably attachable clamping plate;

two opposing lugs fixedly attached to the surface of said clamping plate, each of said lugs having a pivot hole formed therein;

a stop flange fixedly attached perpendicularly to said clamping plate, wherein said stop flange is attached distally from said lugs;

a pivot pin, wherein said pivot pin is inserted through said pivot holes formed in each of said lugs of said clamping plate and said mounting plate to secure said clamping plate and said mounting plate together; and a torsional spring mounted on said pivot pin between said lugs, wherein said torsional spring stops between a surface of said mounting plate and a surface of said clamping plate holding said clamping plate in the clamping position, wherein said clamping position comprises the step of: pressing said stop flange on the front side wall of said mounting plate.

4. A combination cellular telephone and radar detector according to claim 1 wherein said cellular telephone circuitry further comprises:

an RF section circuit for receiving a modulated RF signal from said antenna;

an audio controller connected to said RF section circuit for demodulating an audio signal from said modulated RF signal; a speaker coupled to said audio controller for outputting said audio signal.

5. A combination cellular telephone and radar detector according to claim 1 wherein said radar detection circuitry further comprises:

two input stages, said input stages further comprising: an antenna coupled to a first mixer and a X band and $K_u$ band pre-amplifier by a diplexer, said diplexer having a K band and $K_a$ band rejection filter.

6. A combination cellular telephone and radar detector according to claim 5, wherein said radar detection circuitry detects radar signal in one of the X, $K_u$, K or $K_a$ bands.

7. A combination cellular telephone and radar detector, comprising:
a first housing attachable to a vehicle;
a power supply enclosed within said first housing;
cellular telephone circuitry enclosed within said first housing and electrically connected to said power supply;
a second housing adapted to dock to said first housing;
radar detection circuitry enclosed within said second housing and electrically connected to said power supply.

8. A combination cellular telephone and radar detector, comprising:
a housing;
a clip assembly detachably attachable to said housing, said clip assembly further comprising a spring-loaded clip for selectably securing said housing to a user's belt and to a vehicle;
a power supply enclosed within said housing;
cellular telephone circuitry enclosed within said housing and electrically connected to said power supply;
radar detection circuitry enclosed within said housing and electrically connected to said power supply;
an output speaker enclosed within said housing for outputting audio signals generated by both of said cellular telephone circuitry and said radar detection circuitry;
a keypad mounted on said housing for selecting one of a radar detection mode, a cellular telephone mode, and a hybrid mode for dual operation as a radar detector until an incoming cellular telephone signal is detected;
a display screen surface-mounted on said housing for displaying said selected operational mode.

9. The combination cellular telephone and radar detector according to claim 8, further comprising a clip assembly detachably attachable to said housing for attachment of said combination cellular telephone and radar detector to either a user's belt or underneath a vehicle sunshade.

10. A combination cellular telephone and radar detector according to claim 9, wherein said clip assembly is a spring-loaded clip assembly further comprising:
a mounting plate fixedly attached to the rear of said housing;
two opposing lugs fixedly attached to the surface of said mounting plate, each of said lugs having a pivot hole formed therein;
a detachably attachable clamping plate;
two opposing lugs fixedly attached to the surface of said clamping plate, each of said lugs having a pivot hole formed therein;
a stop flange fixedly attached perpendicularly to said clamping plate, wherein said stop flange is attached distally from said lugs;
a pivot pin, wherein said pivot pin is inserted through said pivot holes formed in each of said lugs of said clamping plate and said mounting plate to secure said clamping plate and said mounting plate together; and
a torsional spring mounted on said pivot pin between said lugs, wherein said torsional spring stops between a surface of said mounting plate and a surface of said clamping plate holding said clamping plate in the clamping position, wherein said clamping position comprises the step of: pressing said stop flange on the front side wall of said mounting plate.

11. A combination cellular telephone and radar detector according to claim 10, wherein said cellular telephone circuitry further comprises:
an RF section circuit for receiving a modulated RF signal from said antenna;
an audio controller connected to said R section circuit for demodulating an audio signal from said modulated RF signal;
a speaker coupled to said audio controller for outputting said audio signal.

12. A combination cellular telephone and radar detector according to claim 11, wherein said radar detection circuitry further comprises:
two input stages, said input stages further comprising: an antenna coupled to a first mixer and a X band and $K_u$ band pre-amplifier by a diplexer, said diplexer having a K band and $K_a$ band rejection filter.

13. A combination cellular telephone and radar detector according to claim 12, wherein said radar detection circuitry detects radar signal in one of the X, $K_u$, K or $K_a$ bands.

* * * * *